April 9, 1968  P. M. CHRISTENSEN ET AL  3,377,608
MOVABLE CONTACT STRUCTURE FOR ABUTTING ENGAGEMENT
Filed July 1, 1966  3 Sheets-Sheet 3

United States Patent Office 3,377,608
Patented Apr. 9, 1968

3,377,608
MOVABLE CONTACT STRUCTURE FOR
ABUTTING ENGAGEMENT
Paul M. Christensen and Martin F. Koenig, Milwaukee,
Wis., assignors to Cutler-Hammer, Inc., Milwaukee,
Wis., a corporation of Delaware
Filed July 1, 1966, Ser. No. 562,303
6 Claims. (Cl. 339—22)

This invention relates to improved plug-in devices for connection to a bus duct and more particularly to a construction which provides improved contact pressure between the plug-in movable contacts and the bus bars. Specifically the invention relates to a means to provide improved contact pressure for contacts making a butt engagement with a flat face of the bus bars.

Bus ducts carrying an incoming supply of current are provided at regularly spaced intervals with openings wherein an electrical apparatus may be connected to the supply through an intermediate plug-in device which connects to the bus duct. These plug-in devices have contacts which extend into the bus duct openings to engage the bus bars, and are further provided with a manually operated circuit breaker or fusible disconnect switch which in turn is connected to the apparatus.

It is desirable to manufacture bus ducts wherein the bus bars are mounted in an edge-to-edge relationship with their flat surfaces accessible to plug-in openings to provide certain overall dimensional advantages. It is further desirable to provide plug-in devices for such bus ducts wherein the contacts butt against the flat surfaces of the bus bars to afford greater strength to the bars as opposed to a "jaw" type of gripping contact which generally require holes or reduced areas to be formed in the bus bars.

One problem associated with plug-in devices for bus ducts resides in maintaining good contact pressure between the plug-in contacts and the bus bars for high amperage values, particularly at heavy in-rush or fault conditions. The butt contact type of construction described above is particularly affected by this problem since it has no gripping qualities. As a result, electromagnetic forces created by such currents tend to move the contact along and away from the bus bar, such movement causing arcing and welding at the contact joint.

It is therefore an object of this invention to provide an improved contact structure for a butt contact joint which resists movement of the movable contact with respect to a stationary bus bar in response to electromagnetic forces created by high amperage currents.

It is a further object of this invention to provide an improved movable contact structure for a butt contact joint in which means are provided to utilize the high amperage currents which create electromagnetic forces tending to move the movable contact with respect to the stationary bus bar to create equal and opposite electromagnetic forces to act upon the movable contact to resist movement thereof.

These and other objects will become more apparent when reading the following specification in conjunction with the drawings, wherein.

Figure 1:
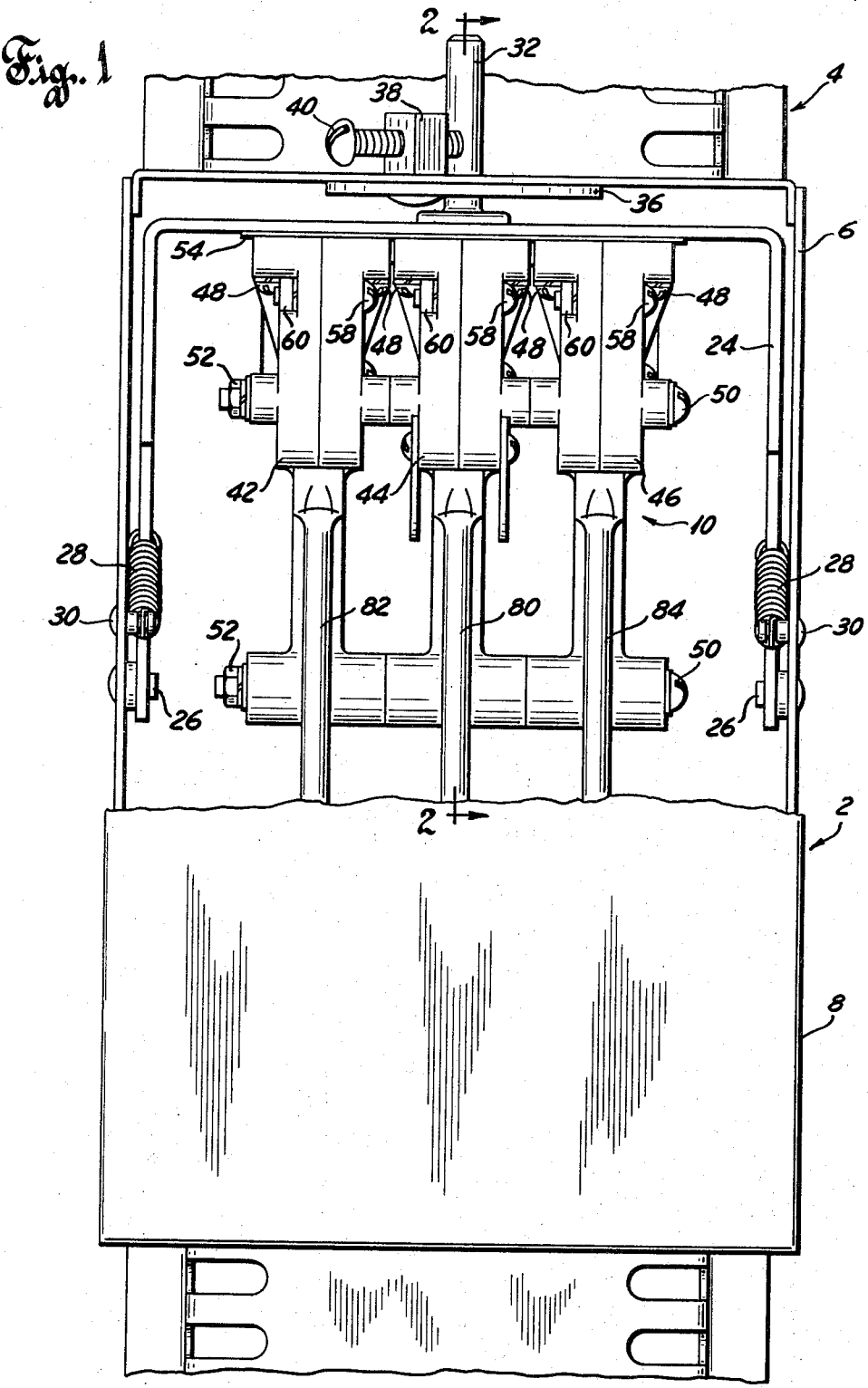
FIGURE 1 is a front view of a plug-in device incorporating the invention and mounted upon a bus duct with a portion of the cover of the device broken away.
Figure 2:
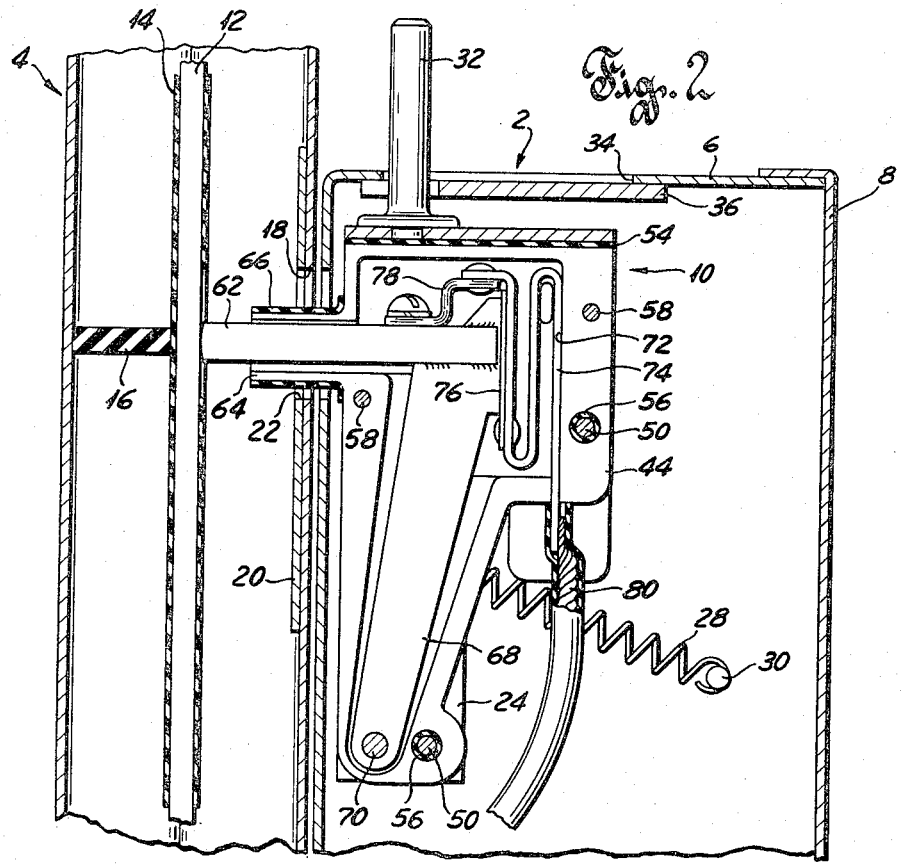
FIG. 2 is a cross-sectional view taken along line 2—2 of FIG. 1 showing the electrical connection of the device to the bus duct.

Referring now to FIGS. 1 and 2 there is shown a plug-in device 2 mounted upon a bus duct 4 by conventional means (not shown). The plug-in device 2 comprises a metal enclosing case 6 and cover 8 which houses a plug-in unit 10 and a circuit making and breaking means such as a fusible disconnect switch or circuit breaker. A manual operator extends through the cover 8 to operate the latter means, these features not being shown in the drawings.

A plurality of bus bar 12, only one of which is shown in FIG. 2, are mounted within the bus duct 4 with their flat faces lying in a common plane. Bus bars 12 are wrapped with an insulating material 14 and are supported within the duct by a plurality of insulating spacers placed on alternate sides of the bars at spaced intervals along the duct, one of which is shown at 16. The duct 4 is further provided with a plurality of windows 18 located at spaced intervals along its length whereby plug-in devices 2 may be mounted to the duct to have access to the bus bars 12. Windows 18 are provided with slide members 20 which normally close the window and may be moved to cause a hole 22 therein to be in alinement with the window 18 when the plug-in device 2 is mounted in place over the window. A portion of the insulation 14 of bus bars 12 is removed to expose the face of the bars in registration with the windows 18.

The plug-in unit 10 has a U-shaped bracket 24 which is pivotally mounted at the ends of its legs upon pins 26 riveted to the sides of case 6. Each of the legs has a spring 28 attached to it and the opposite ends of springs 28 are secured to pins 30 which are also riveted to the sides of case 6. The bight portion of U-shaped bracket 24 is provided with a shaft 32 which extends through an elongated slot 34 in case 6 and the springs 28 bias the unit 10 clockwise, as viewed in FIG. 2, to cause shaft 32 to abut the right-hand edge of slot 34.

A cam arrangement is provided on enclosing case 6 to rotate the plug-in unit 10 counterclockwise to its contact engaging position as depicted in FIG. 2. A hexagonal headed shaft extends through an opening into the case 6 and a cam 36 is rigidly secured to the shaft at the interior of the case. The hexagonal head 38 has a transverse threaded hole which receives a screw 40 to serve as a lever for rotating the shaft and cam 36. A slot in cam 36 engages the shaft 32 and rotation of the cam drives the shaft to the left-hand end of slot 34, rotating the unit 10 to cause the contacts to pass through the window 18 and alined hole 20 to engage the bus bars. The screw 40 may then be threaded through the transverse hole of the hexagonal head 38 to abut the shaft 32 and hold the unit 10 in this position against the bias of springs 28.

The plug-in unit 10 comprises three identical contact housing members 42, 44 and 46, each mounted to the inside of the bight portion of bracket 24 by screws 48 and secured together by a pair of screws 50 which pass through all three housings and receive nuts 52. An insulating strip 54 is placed between bracket 24 and the housings and insulating sleeves 56, which also extend through all three housings, are provided for screws 50. Each of housings 42, 44 and 46 comprise two mirror image halves which are made of an insulating material such as melamine and are secured together as individual housings by screws 58 which pass through the halves and take into nuts 60.

A movable contact assembly is held between the two halves of each of housings 52, 44 and 46 as shown in FIG. 2. Each contact housing and its contact assembly is identical and therefore only housing 44 has been shown in detail. A contact bar 62 extends through an opening in a boss 64 formed on the back side of the housing 44 to engage the bus bar 12 at its exposed face. The boss 64 extends through the open window 18 of bus duct 4 and has an insulating sleeve 66 disposed around it to insulate the bus duct superstructure. The interior end of contact 62 is brazed, or otherwise rigidly secured, to an arm member 68 to form an L-shaped, or dog-leg, assembly which is pivotally mounted within the housing 44 at the end of the arm 68 by a pivot pin 70. The axes of pivot pins 70 for the contact members and the axes of pivot pins 26 for the plug-in unit are arranged to be on the same straight line so that the contact members pivot on the same arc as the plug-in unit to eliminate any transverse displacement of one member relative to the other. The arm 68 has a flat surface at its other end disposed at ninety degrees to the longitudinal direction of the contact bar 62. The housing 44 has a flat interior surface 72 which is on a plane substantially parallel to the plane of the bus bars 12 when the unit 10 is in its contact engaging position.

A reflexed spring member 74 is disposed transversely to the contact bar 62 between the flat surface of arm 68 and the surface 72 to bias the contact 62 linearly outwardly of the housing 44. Spring 74 is formed with a double reverse bend to assume an expanded S-shape, and one outer leg of the spring seats firmly against the surface 72 while the other outer leg seats against the flat surface of arm 68 with an insulator strip 76 secured to that leg and disposed between the leg and the surface of the arm. The radii of the bends of springs 74 are substantially equal so that when the unit 10 is in the contact engaging position shown in FIG. 2 all three legs of spring 74 are substantially parallel with each other and with the surface 72 and the flat surface of arm 68. The spring 74 is positioned so that the midportion of the working length of the legs lies substantially over the contact 62. The leg of spring 74 which carries the insulator 76 is further provided at its free end with a terminal portion bent in the direction of the contact 62 to which one end of a resilient current carrying conductor 78 is secured, its other end being secured to the contact 62.

The leg of spring 74 which seats against the surface 72 also has a terminal position formed at its free end to extend outwardly of the housing 44 to which a braided wire 80 is secured. Similar wires 82 and 84 are secured to the terminals of housings 42 and 46, respectively, and the wires 80, 82 and 84 then lead to the disconnect apparatus mounted in the remaining portion of enclosing case 6. The other side of the disconnect apparatus is connected to the machine or other device to which it is desired to supply power.

Figure 3:
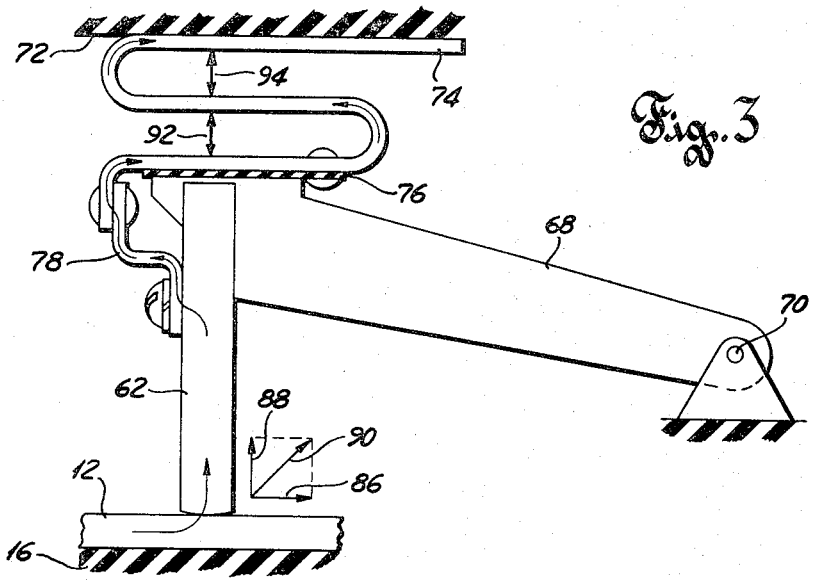
FIG. 3 is a schematic representation of the contact arrangement of the device of FIGS. 1 and 2.

In operation of the plug-in device, let it be assumed that the unit 10 is in its contact engaging position shown in FIG. 2. With particular reference to FIG. 3, the incoming current passes from bus bar 12 into contact 62, then into the resilient conductor 78 and through the reflexed spring member 74 to the wire lead 80 and the disconnect apparatus. Under high amperage current flow conditions, the electromagnetic forces created by such currents tend to move the contact 62 with respect to the bus bar 12 as depicted by the vector diagram drawn adjacent the contact joint. The current in the bus bar 12 creates to a force which tends to rotate the contact 62 endwise to move its exterior end along the bus as represented by vector 86, while the current entering the contact 62 creates a force which tends to move that member away from the bus as represented by vector 88. The resultant of these forces is given by vector 90 which represents the overall force experienced by the contact 62. Current flow in the reverse direction of bus bar 12 would create an electromagnetic force equal to that represented by vector 86, but displaced 180 degrees from the latter, to produce a resultant force upwards and to the left as viewed in FIG. 3.

The component of force upon contact 62 represented by vector 86 which tends to impart endwise rotation to the contact to move its outer end along the bus bars 12 is overcome by the rigid dog-leg assembly which is pivoted at 70 as before described. This prevents contact 62 from canting within the opening in boss 64, therefore preventing the contact from sliding along the bus bar in either direction regardless of the direction of the current within the bus. Contact 62 is made of material having sufficient strength to prevent its bending or deflecting due to the force to eliminate any movement along the bus bar for this reason.

The component of force represented by vector 88 is overcome by the spring 74 in the following manner wherein the well known principle of repulsion of oppositely traveling current paths is utilized to counteract the force component. The current passes through the contact 62 and conductor 78 to pass from left to right through the lower leg of the reflexed spring as viewed in FIG. 3, and around the loop to pass from right to left in the center leg thereof, creating an opposing force between those legs of the spring as represented by the double headed arrow 92. Similarly the current direction in the center leg is reversed in the upper leg which creates an opposing force between these two legs as represented by the double-headed arrow 94. The width of the spring, the length of the legs, the spacing between the legs and the relative position of the spring to contact 62 are designed to provide for opposing forces substantially in line with the contact 62. Since the surface 74 and the flat surface of the arm 68 are parallel in the contact engaging position of unit 10 and since these surfaces are also normal to the longitudinal dimension of contact 62, the forces represented by arrows 92 and 94 act colinearly with the force represented by vector 88. The double reverse path of spring 74 provides an opposing force which is equal to or greater than the force represented by vector 88 through addition of the forces represented by the arrows 92 and 94 and as the current and hence the force 88 increases in magnitude, the opposing force increases proportionally. The effective cancellation of the horizontal and vertical components of force created by high amperage currents effectively eliminate the resultant force and the contact 62 remains in good electrical contact with bus bar 12.

Figure 4:
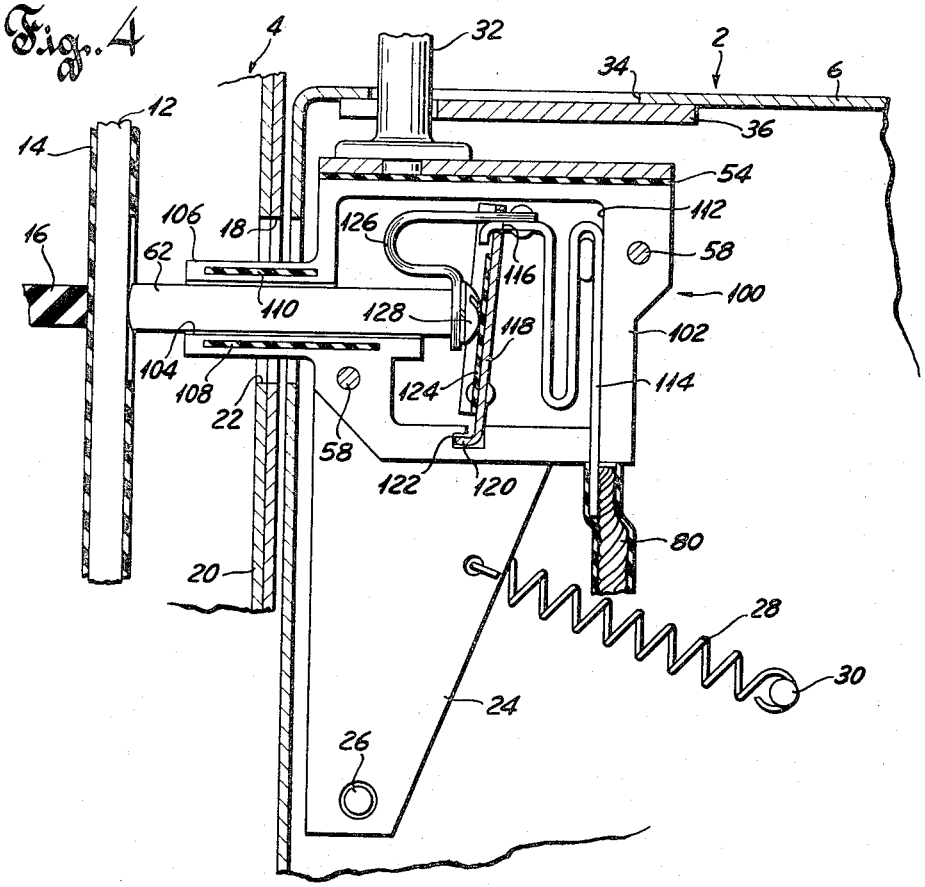
FIG. 4 is a cross-sectional view, similar to FIG. 2, showing a modified version of the invention.
Figure 5:
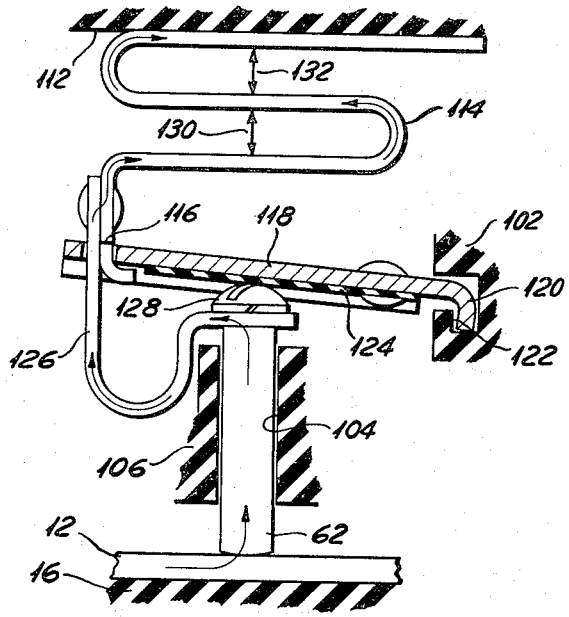
FIG. 5 is a schematic representation of the contact arrangement of the device of FIG. 4.

A modified version of the plug-in unit 10 is shown in FIG. 4, that figure being similar to FIG. 2 but drawn to a slightly greater scale with the modified plug-in unit 100 shown. Like parts have been given like reference characters to facilitate description and understanding of the modified version.

Plug-in unit 100 comprises three identical contact housing members each comprising two mirror image halves, one of which is shown in FIG. 4 at 102. Screws 58 are provided for securing the various housing halves together to form individual contact housings which in turn are secured to bracket 24 with the insulating spaces 54 disposed therebetween.

The movable contact member 62 in this instance is reciprocably mounted in a clearance opening 104 of a boss 106 formed on the back side of housing 102. Opening 104 is only slightly larger than the cross-sectional dimension of contact bar 62 and extends over a majority of the length of contact 62 to guide its reciprocal movement and to limit its end-wise rotational movement, or canting, within the opening. A pair of insulating strips 108 and 110 are placed in corresponding slots in the boss 106 of each half of the housing to insulate the contact 62 along the housing split.

The interior of housing 102 has a surface 112 formed similarly to surface 72 of the previously described unit and a reflexed S-shaped spring 114 is placed in the housing so that one outer leg thereof seats firmly against the surface 112. The other outer leg of spring 114 has its free end disposed at right angles to the leg, the outer end of which is reduced in width to form a pair of shoulders 116 thereon. A lever member 118, having a U-shaped cross-section, has an opening at one end to receive the reduced end of spring 114 whereby the shoulders 116 thereof engage the surface of lever 118. The other end of lever 118 has a pivot portion 120 disposed at right angles to the lever which is received in an opening 122 in the housing. Lever 118 is further provided with an insulating strip 124 secured to the underside of the lever by a rivet or the like.

A resilient connector member 126 is connected at one end to the outwardly extending end portion of spring 114 by rivets or the like and at its other end to the interior end of the contact 62 by a screw 128. As may be seen in the drawings, the insulator 124 bears upon the head of screw 128 and the underside of lever 118 in turn bears against the insulator while the shoulders 116 of spring 114 bear against the opposite surface of lever 118 to bias the contact 62 linearly outwardly of the housing 102. It may be seen in FIG. 4 that when the unit 100 is in position to cause its contacts 62 to engage the bus bars 12 the upper, lower and middle legs of spring 114 are substantially parallel with each other and the surface 112.

The high amperage currents and their electromagnetic forces described in connection with plug-in unit 10 affect plug-in unit 100 in a similar manner. The component of force tending to rotate contact 62 within the opening 104 to move the exterior end of contact 62 along bus bar 12 is again present and is resisted by the small clearance provided for the contact by the opening 104, thus limiting the canting of the contact to a very small degree. The component of force tending to lift the contact 62 off the bus bar 12 is again opposed by the forces created by the reverse current paths of spring 114, as indicated by arrows 130 and 132 and the resulting opposing force of these two forces is transmitted colinearly with the lifting component of force through lever 118 by the shoulders 116 acting upon the surface of the lever. As in the previous version, an increase of current which creates force components of greater magnitude also creates greater opposing forces and the double reverse current paths of spring 114 create a resultant force which is equal to or greater than the lifting component of force.

As may be seen from the foregoing description, improved plug-in units have been provided which resist movement of the contact upon the bus due to electromagnetic forces by mechanically restraining movement of the contact in one direction and by directing the high amperage current producing such forces through a contact spring member to create opposing forces proportionaly larger than the initial forces.

While certain exemplary embodiments have been shown described in the foregoing, it will be apparent that the inventive concepts therein are susceptible to various modifications without departing from the scope of the appended claims.

We claim:
1. An electrical contact assembly for making an abutting engagement with an electrical conductor, the invention comprising, in combination; a housing, a movable contact member extending outwardly and linearly movable of said housing, means for moving said housing and said contact into a circuit making position with said conductor, means for limiting endwise rotational movement of said contact member with respect to said housing to prevent the exterior end of said contact from moving along said conductor, biasing means for biasing said contact outwardly of said housing and into engagement with said conductor comprising a reflexed current carrying member, electrical insulating means interposed between said contact member and said biasing means at the point of biasing engagement, and means electrically connecting said contact member and said biasing means at another point.

2. The combination according to claim 1, wherein said means for limiting endwise rotational movement of said contact member comprises an arm rigidly secured to said contact and extending laterally away from said contact, and wherein the extending end of said arm is pivotally mounted within said housing to provide substantially linear movement of said contact in its longitudinal direction.

3. The combination according to claim 2, wherein said housing is pivotally movable into said circuit making position with said conductor, said housing being pivoted about a point coaxial with the pivot point for said arm.

4. The combination according to claim 3, wherein the legs of said reflexed member are substantially equally disposed on either side of the longitudinal centerline of said contact member, said reflexed member being positioned transversely of the interior end of said contact member whereupon the legs of said reflexed member are substantially parallel with each other and normal to said contact when the latter is in engagement with said conductor.

5. The combination according to claim 1, wherein said means for limiting endwise rotational movement of said contact member includes a clearance opening in said housing for said contact member, said opening being colinear with and closely conforming to said contact member, and wherein the legs of said reflexed member are substantially equally disposed on either side of the longitudinal centerline of said contact member, said reflexed member being positioned transversely of the interior end of said contact member whereupon the legs of said reflexed member are substantially parallel with each other and normal to said contact when the latter is in engagement with said conductor.

6. The combination according to claim 5, wherein said biasing means additionally comprises a lever member having one end thereof pivotally mounted on said housing and the other end thereof in drivable engagement with an end of said reflexed member, whereby said lever member engages the end of said contact member at a point substantially intermediate the ends of said lever, and said insulating means is disposed between said lever member and said contact member at the point of biasing engagement.

References Cited
UNITED STATES PATENTS

| | | | |
|---|---|---|---|
| 2,732,453 | 1/1956 | Talbot | 200—170 |
| 2,732,468 | 1/1956 | Curtis et al. | 200—170 |
| 2,759,076 | 8/1956 | Curtis | 200—170 |
| 3,126,241 | 3/1964 | Papalas | 339—22 |
| 3,289,142 | 11/1966 | Wasileski | 339—22 |

MARVIN A. CHAMPION, *Primary Examiner.*

PATRICK A. CLIFFORD, *Assistant Examiner.*